(No Model.)
W. S. MEAD.
SKINNING ANIMALS.
No. 537,215. Patented Apr. 9, 1895.
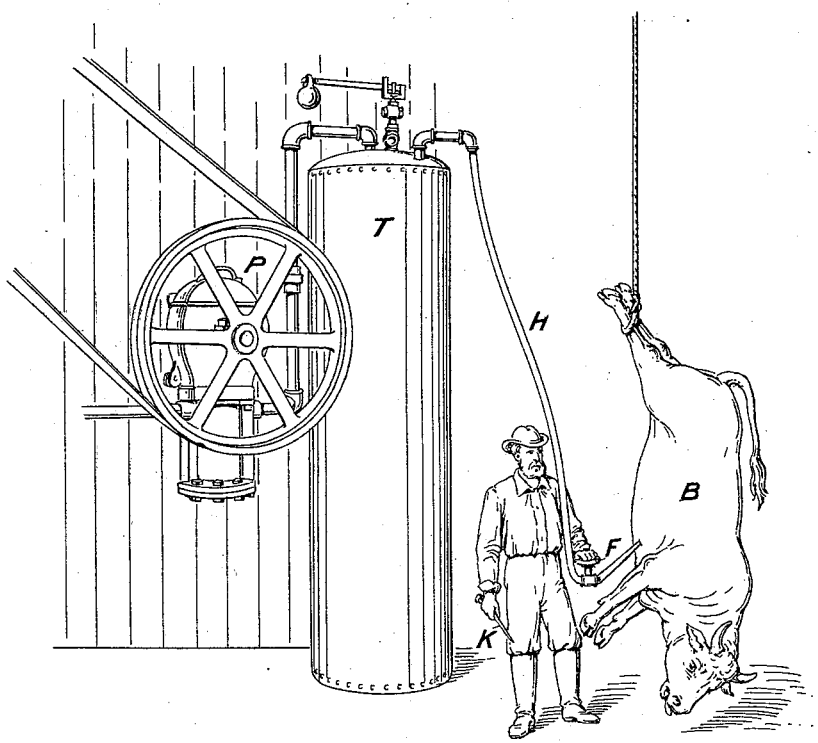
WITNESSES:
INVENTOR
ATTORNEYS.

UNITED STATES PATENT OFFICE.

WILLIAM S. MEAD, OF NEW YORK, N. Y.

SKINNING ANIMALS.

SPECIFICATION forming part of Letters Patent No. 537,215, dated April 9, 1895.

Application filed December 21, 1893. Serial No. 494,324. (No model.)

*To all whom it may concern:*

Be it known that I, WILLIAM S. MEAD, a citizen of the United States, residing in the city, county, and State of New York, have invented certain new and useful Improvements in Skinning Animals, of which the following is a specification.

My present invention relates to the art of skinning animals and it consists of certain novel methods pointed out in the claims concluding this specification.

The drawing annexed hereto illustrates an animal in the act of being skinned by means of compressed air.

At present the skin of animals is usually detached from the flesh by means of a knife. To remove the skin from a large carcass with a knife requires considerable time; and where the hide is to be subsequently used in the arts care has to be exercised to avoid cutting or scoring it. Even by the most expert hands hides are frequently cut, scratched or scored and their value and utility materially diminished.

According to my invention the skin is separated from the flesh by the action of a fluid introduced between the two with a velocity or at a pressure sufficient to separate them. This method may be applied to the skinning of any and all animals and any suitable fluid, either air, gas, vapor or liquid, or two or more of them may be employed and may be injected beneath the skin by any suitable apparatus.

The manner in which I at present prefer to practice my invention, may be thus described, as an example: The animal is first killed or stunned and this may be done in the usual way but preferably without perforating the skin. If the skin has been perforated it is in most cases desirable, if the perforation be not used (as it may be) for the introduction of the injecting tube (as hereinafter described) to sew or tie it up, or otherwise make it more or less fluid or air-tight before proceeding farther. I then preferably introduce an injecting tube provided with a stop-cock beneath the skin, which tube is connected with some suitable source of fluid or fluids, as a fan, bellows or an air-pump or a vessel containing air under pressure or a liquid pump or a vessel containing liquid, such as water, for example, at a suitable altitude to insure the desired pressure. Any suitable means may be employed for this purpose. At present I prefer to use an air-pump. If the tube or nozzle inserted beneath the skin be tapered, it is only necessary, a small cut having been made to admit the passage beneath the skin of the point of the nozzle, to press the nozzle or push it forward until the skin by its own elasticity tightly hugs the exterior surface and makes a fluid tight joint therewith. Fluid (preferably air) under pressure is then, by the means above described, or any other suitable means, introduced through this tube under the skin and serves by its pressure or impact to separate the skin from the flesh. The operation is continued until the skin at all points, or as far as may be desired, is separated from the flesh. The skin may then be removed from the carcass by cutting it free above the hoofs, up the legs and longitudinally through the body, or in any other desired way. The operation of separating the skin from the flesh, if properly conducted, may be accomplished in a very brief period of time and all danger of cutting, scratching or scoring the hide is avoided. Besides, in this way, the entire skin, even that part between the knee and the hoof, which is usually not removed, may be utilized. If it is desired to bleed the animal its throat or jugular vein may be cut after the skin has been separated from the flesh and before it is taken off, as the operation of separating the two may be conducted so rapidly that the blood in the carcass remains uncoagulated after the hide is separated from the flesh.

In the accompanying drawing T is a tank containing compressed air.

P is a pump connected with a suitable source of power (not shown) by means of which the air is forced into the tank T.

H is a hose terminating in a tapering nozzle and provided with a valve F.

B is an animal in the act of being skinned. It will be understood that the drawing is intended to illustrate only one of the many ways in which my process may be worked and that the same being for a method is not limited to the detail devices by which it is carried into effect.

When in the specification and the claims I speak of separating the skin from the flesh it will be understood that the terms are used in their general signification and that the word "flesh" as thus employed includes the fat and all other portions of the carcass.

In the foregoing specification I have referred to some of the modifications which may be employed in the practice of my invention, but I have not endeavored to specify all the modifications which might be employed the object of this specification being to instruct persons skilled in the art to which my invention relates to make and use the same in the form at present preferred by me; but it will be understood that my invention is not limited to the precise details described, as various modifications may be made without departing from its spirit and without exceeding the scope of the concluding claims.

In the concluding claims the omission of an element or the omission of reference to the detail features of the elements mentioned is intended to be a formal declaration of the fact that the omitted elements or features are not essential to the inventions therein severally covered.

What I claim, and desire to secure by Letters Patent, is—

1. The method of skinning animals, which consists in introducing fluid under pressure beneath the skin, sufficient to separate the skin from the flesh.

2. The method of skinning animals which consists in inserting a tube through the skin and introducing through said tube a fluid under pressure sufficient to separate the skin from the flesh.

3. The method of skinning animals, which method consists of inserting through the skin a tapered tube forming a fluid tight joint therewith and forcing through said tube a fluid under pressure sufficient to separate the skin from the flesh.

WM. S. MEAD.

Witnesses:
J. EDGAR BULL,
M. WILSON.